Nov. 8, 1938.   L. T. STUMPF   2,135,648
PRACTICE GOLF CLUB
Filed Aug. 6, 1937
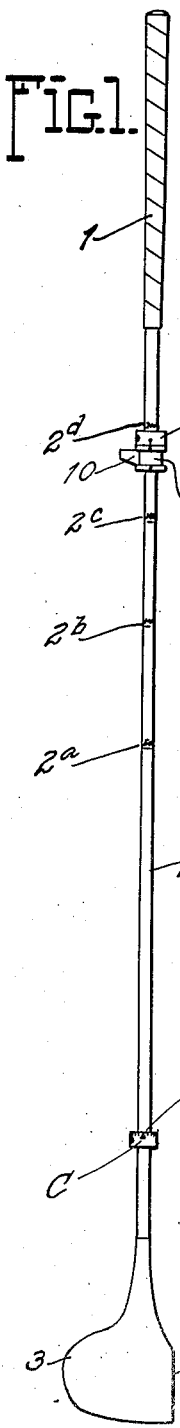
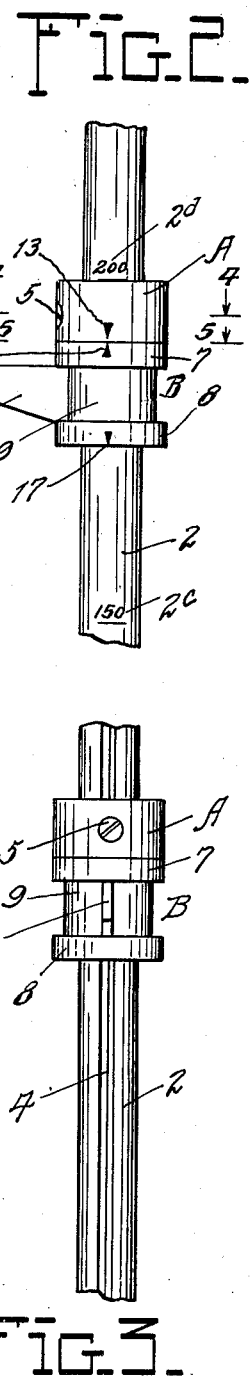
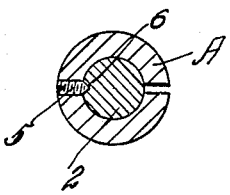
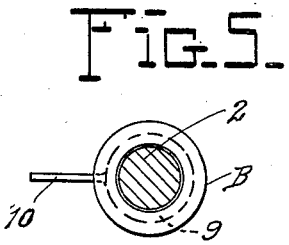
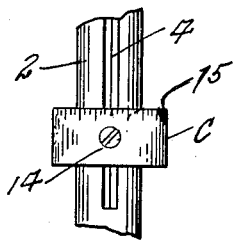
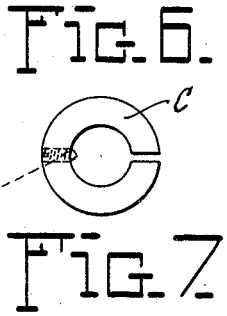
Inventor
LEWIS T. STUMPF.
By Robb & Robb
Attorneys Patented Nov. 8, 1938

2,135,648

UNITED STATES PATENT OFFICE 2,135,648

PRACTICE GOLF CLUB

Lewis T. Stumpf, Cleveland, Ohio

Application August 6, 1937, Serial No. 157,783

14 Claims. (Cl. 273—35)

This invention appertains to the art of measuring centrifugal force and the effects thereof, and is more particularly related to the measurement of centrifugal force as it is created in the movement of a swingable shaft.

In reference to the swingable shafts, the invention has for an object measurement of centrifugal force created at different points in the length of the shaft, and the determination of the amount of swing necessary to create such centrifugal force.

In the movement of the shaft about a fixed or movable axis, the centrifugal force created at any given point thereon is proportionately greater or less in accordance with the distance of such point or points from the axis of the shaft. In other words, the centrifugal force is greatest at a point on the shaft at the greatest distance from the axis or point at the center of the arc of movement thereof.

The present invention provides means mounted upon and adapted to be used in conjunction with a swingable shaft for the calculation of the centrifugal force created at different points in the length of the shaft and the determination of the amount of swing necessary to create such force.

Additionally, the invention provides means for determining the direction of movement of the shaft in the course of its swing and consequently the direction in which the force is expanded.

In carrying out the invention, therefore, I provide a shaft adapted to swing about a movable axis upon which shaft is mounted, means adjustable thereon to the various positions from which it is desired to measure the centrifugal force created by the swing of the shaft, or the amount of swing necessary to create such force.

I further provide releasable signal means normally held in contact with said adjustable means, but which is adapted to be releasable from said adjustable means when a certain rate of movement of the shaft is produced in the course of its swing. The particular rate of movement of the shaft necessary to cause releasing of the releasable signal member will depend, of course, upon the position of the adjustable member upon the shaft.

It will be seen, therefore, that given the amount of force necessary to hold the releasable signal member in contact with the adjustable member, and having discovered the rate of swing necessary to release the signal member, the centrifugal force at the point of release may be calculated. It will also be seen that since the force holding the adjustable and signal members in contact is constant, the amount of swing necessary to cause release of the signal member at any given point on the shaft may be readily determined.

I have found the principles of the invention are particularly useful in their application to the practice of golf technique in a manner found to be helpful in the improvement of the golf club swing in the practice of such technique.

In describing my invention in detail, therefore, I have illustrated the principles thereof as applicable to golf technique in a manner to provide a convenient means for one desiring to improve his golf swing to determine the amount of swing necessary to produce a force sufficient to drive his ball different distances, and also to enable such person to properly direct the swing of his golf club to correspondingly direct the flight of the ball in the desired manner.

In describing the principles of my invention in conjunction with the practice of golf technique, it is to be understood that I do not limit myself to the application of my invention in this manner, but desire rather to illustrate merely one embodiment of the invention by this means.

The invention as applicable to golf technique is now to be more fully described in conjunction with the accompanying drawing, in which:—

Figure 1 illustrates a golf club embodying the force and direction determining means of the invention.

Figure 2 shows a portion of the shank portion of the golf club upon which is mounted adjustable force or distance determining means and a releasable signal member in the form of a sleeve provided with a direction indicating member.

Figure 3 is a view similar to Figure 2 looking in a direction at right angles to that of Figure 2.

Figure 4 is a section taken on the line 4—4 of Figure 2.

Figure 5 is a section taken on the line 5—5 of Figure 2.

Figure 6 is a view showing a lower portion of the shank member upon which is mounted means for calculating the direction of the swing of the club at the end of such swing.

Figure 7 is a detail view of the latter mentioned means of Figure 6.

The golf club illustrated is provided with the usual handle portion 1, shank portion 2, and club head 3. The shank portion of the club is provided with a longitudinal groove or slot 4, and mounted upon the shank so as to encircle the same is an adjustable holding member A provided with a set screw 5, the inner end 6 of which cooperates with the longitudinal groove or slot 4 to prevent rotation of the adjustable member A with relation to the shank 2. The adjustable member A in the embodiment of the invention illustrated is formed of magnetized substance of any suitable material. A releasable signal member B in the form of a sleeve is mounted to freely move upon the shaft, and as illustrated, is provided with shoulder portions 7 and 8 of larger circumference than the middle section 9 of the sleeve B. Attached to the portion 9 of the sleeve member, in any suitable manner, is a vane or direction indicating member 10. The vane 10 is positioned upon the sleeve so that its broadest surface is parallel to the length of the golf club, parallel to the direction of optimum swing thereof, and normally in a position at the opposite side of the shaft with reference to the striking face 11 of the golf club head 3.

The proper positioning of the releasable member B with its vane 10 in relation to the adjustable member A is indicated by the arrows 12 and 13 respectively on said members. At the lower portion of the shank member 2 is a direction calculating and stop member C which is illustrated as being a member similar to the member A encircling the shank portion of the golf club and adapted to be maintained in fixed position thereon by cooperation of the set screw 14 with the longitudinal groove or slot 4 of the shank.

As seen in Figure 6, the member C is provided with an indicating arrow 15 in a line with the arrows 12, 13 and 17 of the members A and B, and is of magnetized substance.

The adjustable member A is adapted to be fixed at various positions along the length of the shank 2 upon proper adjustment of the set screw 5.

Bearing in mind the fact that the centrifugal force created in a swingable shaft is greatest at points on the shaft furthest from the center or axis of the arc of the shaft swing and consequently that for a given rate of movement of the golf club during the course of a swing the centrifugal force exerted thereby will vary at different points in the length of the shank, it will be seen that the closer the adjustable member A is positioned with respect to the fixed member C, the less will be the amount of swing necessary to overcome the magnetic attraction of the member A for the member B, thereby to cause releasing of the member B from the member A and passage of the member B along the shank toward the member C, as a result of the centrifugal force created by the swing of the club.

Conversely, the higher up the shank 2 the member A is positioned, or in other words, the nearer it is positioned to the handle member 1, the greater will be the amount of swing necessary to cause the member B to be released from the magnetic attraction of the member A as a result of the centrifugal force created by the swing of the golf club.

The shank 2 is, of course, the shaft of the golf club.

Now it is well known in the practice of golf technique that the rate of movement of the golf club in the course of its swing largely determines the distance the golf ball will go in flight upon contact of the striking surface 11 with said golf ball. It is well known also that most golf amateurs are unable to get the greatest benefit from their golf swing because of the fact that they have not succeeded in getting the golf club head to move at a much greater rate of speed than the handle portion of the golf club. Of course, in any swing of the golf club the club head will move at a greater rate of speed than the handle member but the tendency of the golf amateur is to swing the club with his whole body depending upon his arm movement to produce the swing and neglecting the wrist action which enables the multiplication of the force the arm movement exerts upon the golf swing many times beyond that which the said arm movement of itself develops. Use of the invention teaches the necessity for developing wrist action.

The shank member 2 of the golf club in accordance with my invention will be provided with indicia thereon as at 2a, 2b, 2c, and 2d, at which points, when the member A is set at one of them, will be indicated the number of yards a golf ball will travel when hit by the striking face 11 of the club head 3, in the course of a swing of the golf club which causes the releasable member B to become released from the member A. For example, suppose that the adjustable member A is set at the point 2a at which point will be seen the indicia "50". Now, if in the course of a practice swing the person swinging the club causes the member B to release from the member A, he will know that this swing would have caused his ball to travel fifty yards, and he will then move the adjustable member A to the indicia mark "100" shown at 2b and continue practicing swings until he has caused the member B again to release at which time he will know that his swing would have caused the ball to travel one hundred yards. The person using the golf club to aid in improving his golf swing will continue to adjust the adjustable member A higher up on the shank 2 as he becomes more proficient with his golf swing and by following the procedure above outlined, he will continue to improve his swing as he learns to get the proper whip action to cause the member B to release. Thus the member B serves to indicate or signal to the user of a golf club so equipped the attainment of a particular rate of swing of the club, i. e., one that would cause a ball, if struck during such swing to travel fifty yards, one hundred yards, and so forth.

Another difficulty of the golf beginner to overcome is what is known as a "hook" or a "slice". If, in the course of the golf swing, the club face 11 is caused to cross rather to parallel the desired line of flight of the golf ball in either direction, a spin will be imparted to the ball as the club face strikes it, which will cause the ball in the course of its flight to curve in one direction or the other depending upon the direction in which the original swing of the club caused the club face 11 to cross the desired line of flight of the ball.

A measure of the distance by which the swing of the golf club was out of parallel with the desired line of flight of the ball will be indicated in the use of my invention by the vane member 10. As stated hereinbefore, the said vane member 10 is positioned, when the arrows 12 and 13 on the members B and A respectively are opposite each other, parallel to the desired line of flight of the ball. Now, if in the course of a swing the amateur golfer using a golf club provided with my invention causes the club face 11 to cross the desired line of flight of the ball in a leftward direction which would impart a clockwise spin to the ball producing a "slice", or rightward curve, in its course of flight, the member B when released by the centrifugal force of the swing will be caused to rotate by the effect of the onrushing air upon the vane 10 causing said vane to parallel the line of the actual swing of the club. At the end of the stroke the member B would be in contact with the member C, having been forced outwardly along the shank 2 of the club by the centrifugal force of the swing and said member B would be held in contact with the member C by the magnetic force of the latter. At the end of the swing causing the "slice" just described, the arrow 17 would have a position to the right of the arrow 15, referring to Figure 6. In describing the manner of operation as above, we are assuming, of course, that the person using the golf club is producing a swing by which he is enabled to cause the member B to release at a certain point indicated on the shank of the club.

Similarly to the manner of operation of the vane 10 on the member B, in the course of a "slice", the vane member would cause the sleeve member B to rotate in an opposite direction in the course of a swing causing a "hook". In the use of the invention, the person using the club will be enabled to correct his swing to prevent a "slice" or a "hook" by noting the position of the arrow 17 with respect to the position of the arrow 15 at the end of each swing and taking measures to correct the difficulty.

It should be noted that the invention is not limited to the use of magnetic metal in the members A and C. The invention contemplates the use of a member A for normally maintaining the member B in contact therewith, but releasable therefrom in accordance with various degrees of movement of the club in the course of its swing depending upon the position of the member A upon the shank 2 and any suitable means for the purpose described may be employed. Similarly, with reference to the member C, any means for causing the member B to be maintained in contact therewith at the end of a swing of the slub during which the member B is released from the member A is contemplated within the purview of the invention.

Having thus described my invention, what I claim as new and desire to secure by Letters Patent of the United States is:—

1. In a device of the class described, the combination with a swingable shaft, of an adjustable member mounted thereon shiftable to various positions along said shaft, a signal member normally held in position by coaction with said adjustable member, and means to normally hold said adjustable member at the different positions requiring a difference of force to displace the signal member from the adjustable member, said signal member being adapted to be released from said holding relation under the influence of centrifugal force produced by a predetermined rate of movement of the shaft during the course of its swing.

2. In a device of the class described, the combination, with a swingable shaft, of an adjustable member mounted thereon, said member being adjustable to fixed position at various points in the length of the shaft, a signal member normally maintained in position by coaction with the adjustable member, means to normally maintain said holding relation between said members, said signal member being adapted to be released from said holding relation under the influence of centrifugal force produced by different rates of movement of the shaft during the course of its swing corresponding to the position of the adjustable member upon the shaft, and means to limit the movement of the signal member along the shaft and hold it at stopped position.

3. A golf club, comprising, in combination a swingable shaft, an adjustable member of magnetic material mounted upon said shaft, a signal member normally maintained in contact with said adjustable member by magnetic attraction of the latter, said signal member being adapted to be released from the magnetic influence of the adjustable member by centrifugal force during the course of swing of the shaft, and means to hold the signal member in the position assumed at the end of a swing.

4. A device as claimed in claim 1, wherein the signal member comprises a sleeve adapted to slide freely along said shaft.

5. A golf club, comprising, in combination a swingable shaft, an adjustable member mounted thereon and adjustable to fixed position at various points in the length of the shaft, a stop member mounted upon said shaft a distance from said adjustable member, a signal member normally maintained in position by coaction with said adjustable member, means to normally maintain coaction between said adjustable and releasable members, said signal member being adapted to be released from contact with said adjustable member by centrifugal force during the course of swing of the shaft and thereupon to contact with said stop member, and said stop means having means to maintain coaction of said stop member and signal member.

6. A golf club, comprising, in combination a swingable shaft, an adjustable member mounted thereon, a signal member normally maintained in position by coaction with said adjustable member, means to normally maintain coaction between said members, and an indicating device cooperating with said signal member, said latter member being adapted to be released from contact with said adjustable member by centrifugal force during the course of swing of the shaft, said indicating device having air-controlled means for holding it in a predetermined position during its movement on the shaft when the latter is swung.

7. A device as claimed in claim 6, wherein the indicating device comprises a vane member.

8. A device as claimed in claim 6, wherein the first mentioned means comprises a sleeve rotatably mounted upon the shaft and the indicating device comprises a vane member cooperating with said sleeve.

9. A golf club, comprising, in combination a swingable shaft, an adjustable member mounted thereon, a stop member mounted upon said shaft at a distance from said adjustable member, a signal member normally maintained in position by coaction with said adjustable member, means to normally maintain said holding relation between said signal and adjustable members, an indicating device cooperating with said signal member, said latter member being adapted to be released from contact with said adjustable member by centrifugal force during the course of swing of the shaft and thereupon to contact said stop member, said stop member maintaining contact of said stop and signal members whereby to enable the indicating device to retain the position assumed.

10. A golf club, comprising, in combination a swingable shaft, an adjustable member mounted thereon, a stop member mounted upon said shaft at a distance from said adjustable member, a signal member comprising a sleeve mounted upon the shaft and normally maintained in position by coaction with said adjustable member, said members having corresponding indicia, means to normally maintain contact between said adjustable and signal members, an indicating device comprising a vane and cooperating with said signal member, said latter member being adapted to be released from contact with said adjustable member by centrifugal force during the course of the swing of the shaft and thereupon to contact said stop member, said vane being adapted to rotate said sleeve when the swing of the shaft is out of a line parallel to the original position of the vane, said stop member maintaining contact of said stop and signal member.

11. A golf club, comprising, in combination, a shaft, an indicating device, means mounted on said shaft and cooperating with said device for normally maintaining the same in position, said device being actuatable by the pressure of air thereupon during the course of swing of the shaft to indicate position at end of swing of shaft due to shift about the longitudinal axis of said shaft during swing.

12. A golf club, comprising, in combination, a shaft, an indicating device, means mounted on said shaft and cooperating with said device for normally maintaining the same in a predetermined position preliminary to swing of the shaft, said device being actuatable by the pressure of air thereupon during the course of swing of the shaft to assume a position indicating relative change of position of the shaft during swing, and means associated with said shaft for maintaining said member in said latter position.

13. A golf club, comprising, in combination, a shaft, an indicating device, means mounted on said shaft and cooperating with said device for normally maintaining the same in a predetermined position preliminary to swing of the shaft, said device being actuatable by the pressure of air thereupon during the course of swing of the shaft to assume a position indicating relative change of position of the shaft during swing, and means associated with said shaft for maintaining said member in said latter position, and corresponding indicia related to each of said means and said device to determine the degree of change.

14. A golf club, comprising, in combination, a shaft having distance indicia thereon and a ball striking portion, an adjustable member mounted on said shaft and adjustable to fixed position at various points in the length of the shaft, a signal member normally maintained in position by coaction with said adjustable member, and means to normally maintain said holding relation between said members, said signal member being releasable from said holding relation under the influence of centrifugal force produced by predetermined rates of movement of the shaft during the course of its swing corresponding to the position of the adjustable member upon the shaft, the indicia at a particular point of adjustment of said adjustable member being correlated with the distance a ball would travel if struck by said ball striking portion during the course of a swing of the shaft causing release of said signal member when said adjustable member is fixed at said particular point of adjustment.

LEWIS T. STUMPF.